United States Patent
Lee et al.

(10) Patent No.: US 7,680,111 B2
(45) Date of Patent: Mar. 16, 2010

(54) COMMUNICATION METHOD USING MOBILE IPV6 IN NAT-PT ENVIRONMENT AND STORAGE MEDIUM THEREOF

(75) Inventors: Joo-Chul Lee, Daejeon (KR); Myung-Ki Shin, Daejeon (KR); Hee-Cheol Lee, Daejeon (KR); Hyoung-Jun Kim, Daejeon (KR); Ki-Shic Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1032 days.

(21) Appl. No.: 10/864,742

(22) Filed: Jun. 8, 2004

(65) Prior Publication Data

US 2005/0083969 A1 Apr. 21, 2005

(30) Foreign Application Priority Data

Oct. 15, 2003 (KR) .................... 10-2003-0071728

(51) Int. Cl.
*H04L 12/28* (2006.01)
(52) U.S. Cl. .................... 370/392; 370/401; 370/466
(58) Field of Classification Search ............... 370/392, 370/401, 402, 466, 254, 351, 389
See application file for complete search history.

(56) References Cited

U.S. PATENT DOCUMENTS

| | | | |
|---|---|---|---|
| 6,038,233 A * | 3/2000 | Hamamoto et al. | 370/401 |
| 6,172,986 B1 * | 1/2001 | Watanuki et al. | 370/466 |
| 6,865,184 B2 * | 3/2005 | Thubert et al. | 370/401 |
| 7,031,328 B2 * | 4/2006 | Thubert et al. | 370/401 |
| 7,162,529 B2 * | 1/2007 | Morishige et al. | 709/230 |
| 2004/0156374 A1 * | 8/2004 | Lee et al. | 370/401 |
| 2005/0044362 A1 * | 2/2005 | Haddad et al. | 713/170 |

OTHER PUBLICATIONS

Considerations for Mobility Suppport in NAT-PT, 7 pages.

* cited by examiner

*Primary Examiner*—Seema S Rao
*Assistant Examiner*—Mon Cheri S Davenport
(74) *Attorney, Agent, or Firm*—Blakely, Sokoloff, Taylor & Zafman

(57) ABSTRACT

Disclosed is a communication method using the mobile IPv6 in the NAT-PT environment, and a recording medium storing the method. An NAT-PT (Network Address Translation-Protocol Translation) box as a substitute for an IPv4 node in the communication method performs an RR (Return Routability) process and a BU (Binding Update) process with an IPv6 node to allow data communication between the IPv4 node and the IPv6 node. Therefore, mobility support using the mobile IPv6 is provided in the network with the mixed IPv4 and IPv6.

8 Claims, 4 Drawing Sheets

COMMUNICATION METHOD USING MOBILE IPV6 IN NAT-PT ENVIRONMENT AND STORAGE MEDIUM THEREOF

CROSS REFERENCE TO RELATED APPLICATION

This application claims priority to and the benefit of Korea Patent Application No. 2003-71728 filed on Oct. 15, 2003 in the Korean Intellectual Property Office, the entire content of which is incorporated herein by reference.

BACKGROUND OF THE INVENTION (a) Field of the Invention

The present invention relates to a communication method using the mobile IPv6 (Internet Protocol version 6). More specifically, the present invention relates to an NAT-PT applied communication method in the IPv6 network.

(b) Description of the Related Art

IP networking represented by mobile communication and the Internet has become the most popular issue in the IT industry.

Mobile communication has been popularized because of fast distribution of wireless mobile communication nodes other than wired nodes, and it has been facing a new trend together with network unification movements on the basis of recently issued wireless LAN and IPs.

Also, IP networking is expected to cause great demands of IP addresses because of unification of the IP-based networks, and accordingly, the IPv6 which is the next version of the IPv4 has been developed in preparation for the demands.

Respective nodes are identified by IP addresses in the IP network, and the addresses are varied according to moving to an area. Therefore, it is needed for a node to be able to move to another area without changing the IP address in the current communication process because of the characteristic of the IP network which communicates by using the IP addresses as identifiers of the respective nodes. Without this ability, the communication is disabled when the node leaves the area in which the node can perform communication with the IP address possessed by the node.

The mobile IP technology has been proposed in order to solve the problem. When a communicating node (referred to as an MN (mobile node) hereinafter) moves to a new area, an IP address (referred to as a COA (care of address) hereinafter) appropriate for the new area is newly allocated to the MN in addition to the IP address currently in use.

The biggest problem with introducing the IPv6 because of address exhaustion in the IPv4 is that it is substantially impossible to exchange a lot of IPv4-based Internet nodes for the IPv6 nodes at once. Therefore, a technique for linking the IPv6 nodes and the IPv4 nodes and thereby preventing coexistence of the IPv6 and IPv4 nodes while transferring to the IPv6 nodes is required, which is the NAT-PT (Network Address Translation-Protocol Translation.)

The NAT-PT belongs to conversion techniques executed by the NGTrans (Next Generation Transition) working group, based on the NAT (Network Address Translation) technique. A major purpose of the NAT-PT is to convert IPv6 headers and IPv4 headers and allow communication between IPv6 nodes and IPv4 nodes. In order to achieve this purpose, an NAT-PT box is provided between the IPv6 network and the IPv4 network, and it mutually converts IPv6 packets and IPv4 packets. The NAT-PT technique is performed normally in most conventional protocols, but it does not consider the environment of the mobile IPv6.

The mobile IPv6 technique is to maintain communication without disconnection when an MN which performs IP communication on the IP network moves to another area.

To achieve this, the MN receives and uses a new address available in another area each time it moves thereto, and the MN transmits and receives information on the newly allocated address (i.e., a COA) to/from a CN (correspondent node) in order to perform communication by using the COA. Also, the MN combines the COA and an HA (home address) originally possessed by the MN to use an IPv6 extended header in order to maintain the communication in the new area. However, in this case, the usage of the mobile IPv6 basically assumes that both nodes are IPv6 nodes with no consideration of usage of the NAT-PT applied network.

Therefore, realization of the NAT-PT may have a problem when an IPv6 node attempts communication with an IPv4 node by using a mobile IP in the NAT-PT environment, since the communication between the IPv6 node and the IPv4 node is possible through the NAT-PT box but the CN communicated by each node is actually a different node even if it seems to use an IP of the same version through a header conversion. Accordingly, the mobile IPv6 mechanism cannot be normally operated unless the NAT-PT box which controls the conversion therebetween performs additional processes when the mobile IPv6 node follows the mobile IPv6 mechanism and is operated.

SUMMARY OF THE INVENTION

It is an advantage of the present invention to provide a communication method for communicating with IPv4 nodes as well as IPv6 nodes when an IPv6 node supporting the mobile IPv6 attempts to communicate with other nodes, and a recording medium storing the method.

To achieve the advantage, the NAT-PT technique is complemented so that the IPv6 MN may communicate with the IPv4 CN when the mobile IPv6 is applied in the IPv6 network to which the NAT-PT is applied, and the NAT-PT box processes messages related to the mobile IPv6 and transmitted to the IPv4 CN when the IPv6 MN moves to another area, thereby providing natural communication.

In one aspect of the present invention, a method for an IPv6 node to communicate with a foreign IPv4 node by using the mobile IPv6 in the NAT-PT (Network Address Translation-Protocol Translation) environment, comprises: (a) allowing an NAT-PT box to receive an RR (Return Routability) request transmitted to the IPv4 node from an IPv6 node moved from a home network to another network, and perform an RR process as a substitute for the IPv4 node; (b) allowing the NAT-PT box to receive a BU (Binding Update) message transmitted to the IPv4 node from the IPv6 node, and perform a BU process as a substitute for the IPv4 node; and (c) allowing the NAT-PT box to use BU information generated when performing the BU process, and perform data communication between the IPv6 node and the IPv4 node.

The (a) comprises: allowing the NAT-PT box to snatch a CoTI (Care-of Test Init) message and an HoTI (Home Test Init) message transmitted to the IPv4 node from the IPv6 node; allowing the NAT-PT box to store entries generated by mapping parameter information (Care-of Init cookie) included in the CoTI message and the HoTI message, and parameter information (Kcn, Home nonce index, and Care-of nonce index) generated by the NAT-PT to the address of the IPv4 node in a table (a kcn/nonce table); and allowing the NAT-PT box to transmit a CoT message and an HoT message to the IPv6 node in response to the CoTI message and the HoTI message, and terminate the RR process.

The (b) comprises: allowing the NAT-PT box to snatch the BU message transmitted to the IPv4 node from the IPv6 node; allowing the NAT-PT box to store information on an HA (Home Address) and a COA (Care of Address) of the IPv6 node in a binding cache table; and allowing the NAT-PT box as a substitute for the IPv4 node to transmit a BA (Binding Acknowledge) message to the IPv6 node in response to the BU message.

The (c) comprises: snatching an IPv6 packet transmitted from the IPv6 node, the IPv6 packet having a destination option header including HA information of the IPv6 node; eliminating the destination option header, converting the IPv6 packet into an IPv4 packet, and transmitting it to the IPv4 node; and receiving the IPv4 packet from the IPv4 node, referring to contents of the binding cache table, converting the HA of the IPv6 node into the IPv6 packet included in a routing header, and transmitting the same to the IPv6 node.

In another aspect of the present invention, a method for an IPv6 node to communicate with a foreign IPv4 node by using the mobile IPv6 in the NAT-PT environment comprises: (a) allowing an NAT-PT box to snatch an RR message transmitted to the IPv4 node from an IPv6 node moved from a home network to another network, and perform an RR process as a substitute for the IPv4 node; (b) allowing the NAT-PT box to snatch a BU message transmitted to the IPv4 node from the IPv6 node, store information on an HA (Home Address) and a COA of the IPv6 node in a binding cache table, and transmit a BA message to the IPv6 node; and (c) allowing the NAT-PT box to use the information on the HA and the COA of the IPv6 node stored in the binding cache table, and perform data communication between the IPv6 node and the IPv4 node.

The (a) comprises: allowing the NAT-PT box to snatch a CoTI message and an HoTI message transmitted to the IPv4 node from the IPv6 node; allowing the NAT-PT box to store entries generated by mapping parameter information included in the CoTI message and the HoTI message, and parameter information (Kcn, Home nonce index, and Care-of nonce index) generated by the NAT-PT to the address of the IPv4 node in a table (a kcn/nonce table); and allowing the NAT-PT box to transmit a CoT message and an HoT message to the IPv6 node in response to the CoTI message and the HoTI message, and terminate the RR process.

In still another aspect of the present invention, in a recording medium for storing a program readable by a computer, the program being provided to an NAT-PT box for allowing an IPv6 node to use the mobile IPv6 and perform communication with a foreign IPv4 node, the program comprises: receiving an RR request transmitted to the IPv4 node from an IPv6 node moved from a home network to another network, and performing an RR process as a substitute for the IPv4 node; receiving a BU message transmitted to the IPv4 node from the IPv6 node, and performing a BU process as a substitute for the IPv4 node; and using BU information generated when performing the BU process, and performing data communication between the IPv6 node and the IPv4 node.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
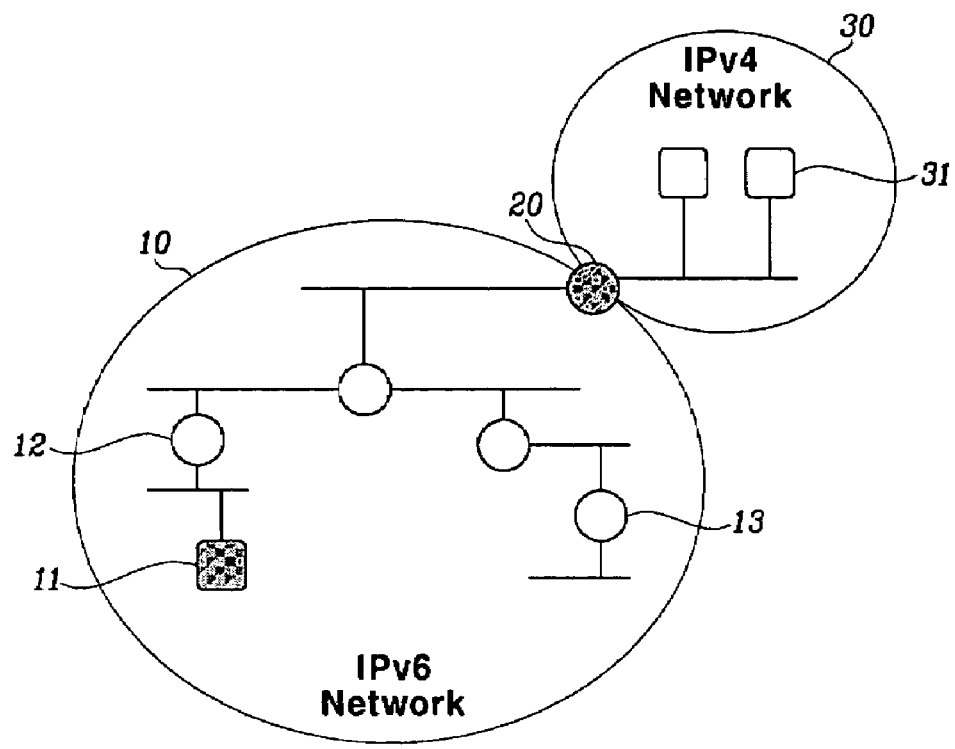
FIG. 1 shows a system for applying a mobile IPv6-based communication method according to a preferred embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

An NAT-PT (Network Address Translation-Protocol Translation) environment to which the communication method according to the preferred embodiment of the present invention is applied will be described in detail with reference to FIG. 1.

FIG. 1 shows a configuration diagram of an NAT-PT environmental system to which the communication method according to the preferred embodiment of the present invention is applied.

As shown, the NAT-PT environmental system comprises an IPv6 network 10, an MN (Mobile Node) 11, routers 12 and 13, an NAT-PT box 20, an IPv4 network 30, and a CN (Correspondent Node) 31. The router 12 represents an HN (Home Network), and the router 13 represents a foreign network.

The MN 11 is a mobile node for performing communication, and is included in the mobile IPv6 network 10 to which the NAT-PT is applied, and the CN 31 is a node to be communicated with by the MN 11, and is included in the IPv4 network 30.

The NAT-PT box 20 is provided between the IPv6 network 10 and the IPv4 network 30 and performs interface between the two networks 10 and 30. The NAT-PT box 20 converts headers of general packets, and processes corresponding mobile IPv6 messages so that the IPv4 CN 31 may be detected as a mobile IPv6 CN when the mobile IPv6 node 11 attempts communication with the IPv4 CN 31.

Categories of the mobile IPv6 are given below.

① Messages used for the RR (Return Routability) procedure:

Home Test Init message (HoTI);

Care-of Test Init message (CoTI);

Home Test message (HoT); and

Care-of Test message (CoT).

②Messages used for the BU (Binding Update) procedure:
Binding Update message (BU); and
Binding Acknowledge message (BA).

③ Data packets used for general data communication:
Packets with Type-2 routing headers; and
Packets with destination option headers.

Referring to FIGS. 2 to 8, a communication method in the mobile IPv6 network to which the NAT-PT is applied will be described.

FIGS. 2 to 8 show communication processes and data flows in the IPv6 network to which the NAT-PT is applied according to the preferred embodiment.

Figure 2:
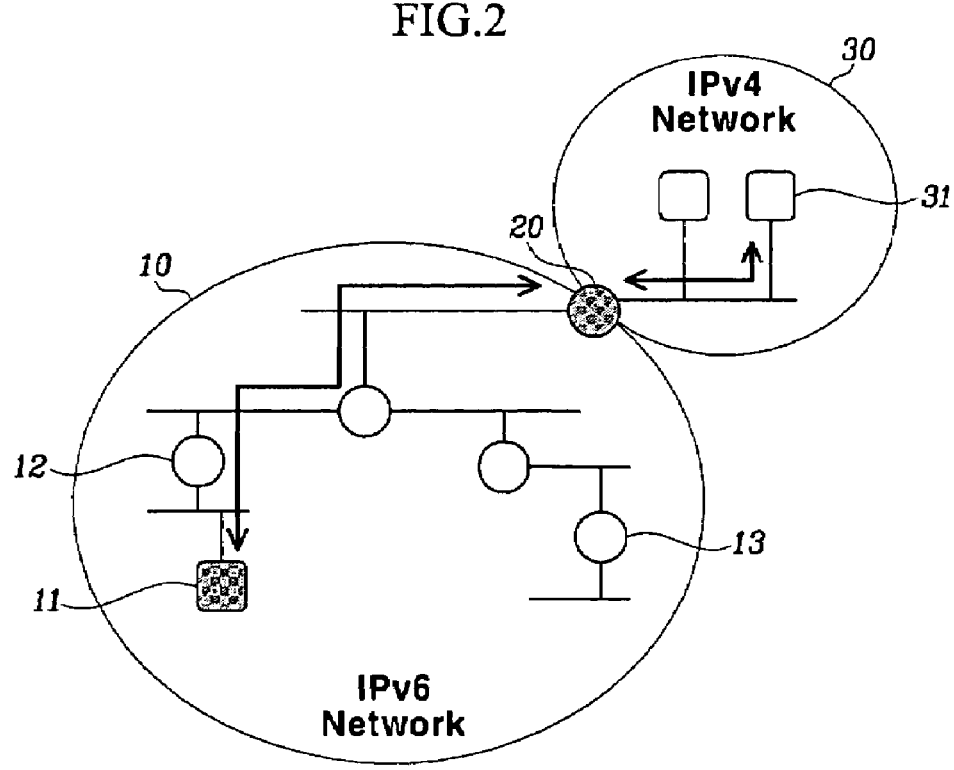
FIG. 2 shows a state in which an IPv6 MN is provided on a home network in the communication system according to a preferred embodiment of the present invention.

As shown in FIG. 2, when the IPv6 MN 11 communicates with the CN 31 of the IPv4 network 30 while not leaving the HN 12 in the IPv6 network 10 to which the NAT-PT is applied, the IPv6 MN 11 is operated according to the same communication as the general communication between the IPv6 node and the IPv4 node.

Figure 3:
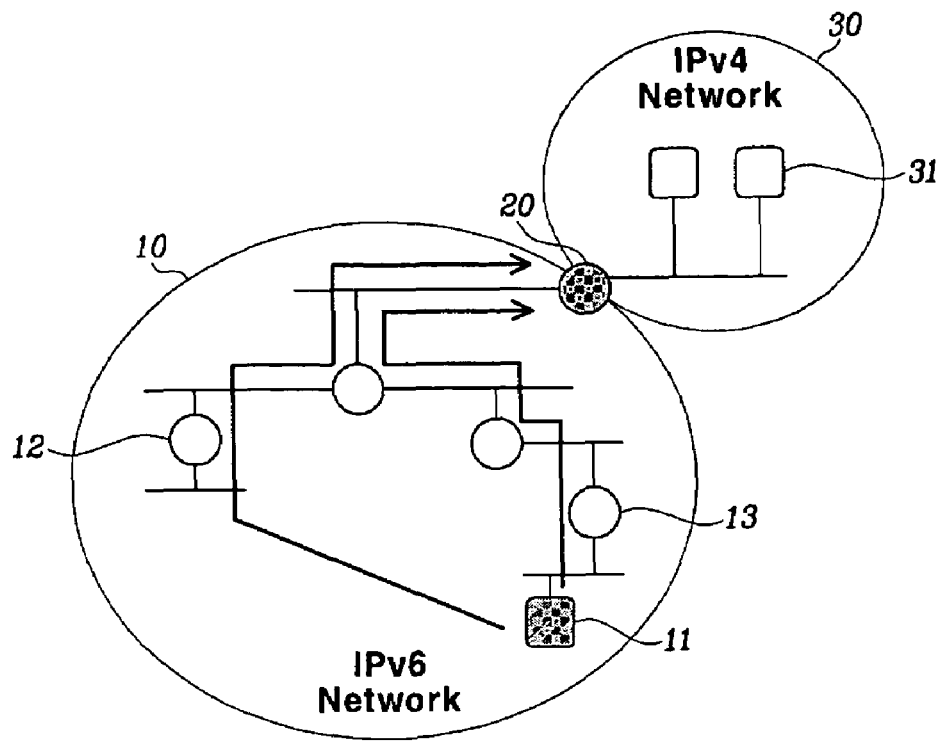
FIG. 3 shows a process for an IPv6 MN to move to another network and begin an RR procedure in the communication system according to a preferred embodiment of the present invention.

As shown in FIG. 3, when the IPv6 MN 11 leaves the HN 12 for a different network 13, the MN 11 detects that the MN 11 has left the HN 12 and moved to the different network 13, and reports to the CN 31 that the COA of the MN 11 is changed through the BU process. In this instance, before executing the BU process, the MN 11 determines whether the changed COA is a reachable address through the RR process.

However, the CN 31 communicating with the IPv6 MN 11 cannot finish the RR process since it is a node belonging to the IPv4 network 30. Therefore, the NAT-PT box 20 snatches the RR message provided by the IPv6 MN 11 and responds to it instead of allowing the IPv4 CN to respond.

For this, the NAT-PT box 20 maintains a subsequent data structure in addition to an IPv4/IPv6 mapping table.

Binding Cache Table={HA, COA, Lifetime, Flag, Seq. no. Usage info} and

Kcn/nonce Table={HA, COA, CN, Kcn, Home Nonce index, Care-of Nonce Index}

When the IPv6 MN 11 transmits the BU message to the IPv4 CN 31, the NAT-PT box 20 snatches the message and generates the binding cache table referring to the message contents. Also, when a packet destined to the IPv6 MN 11 is provided to the NAT-PT box 20 from the IPv4 CN 31, the NAT-PT box 20 uses the binding cache table to convert the IPv4 packet transmitted by the IPv4 CN 31 into a mobile IPv6 packet format with a routing header thereon, and transmits the same to the IPv6 MN 11.

When receiving the packets of the HoTI and the COTI, the NAT-PT box 20 transmits messages of the HoT and the CoT to the IPv6 MN 11 in response to the respective messages while processing the RR procedure, and in this instance, the NAT-PT box 20 generates parameters of Care-of keygen token and Care-of nonce index, includes them into the messages of the HoT and the CoT, and transmits them out.

Further, the kcn and the nonce index maintained by the CN 31 are needed in order to generate the parameters of Care-of keygen token and Care-of nonce index, and since the NAT-PT box 20 performs the RR procedure as a substitute for the IPv4 CN 31, the NAT-PT box 20 maintains and manages entries of the kcn and the nonce index table for each IPv4 CN 31. Therefore, the NAT-PT box 20 receives the GoTI and the HoTI from the IPv6 MN 11, and adds them as entries to the kcn/nonce table of the NAT-PT box 20.

Details of the respective objects during this process are given below.

Figure 4:
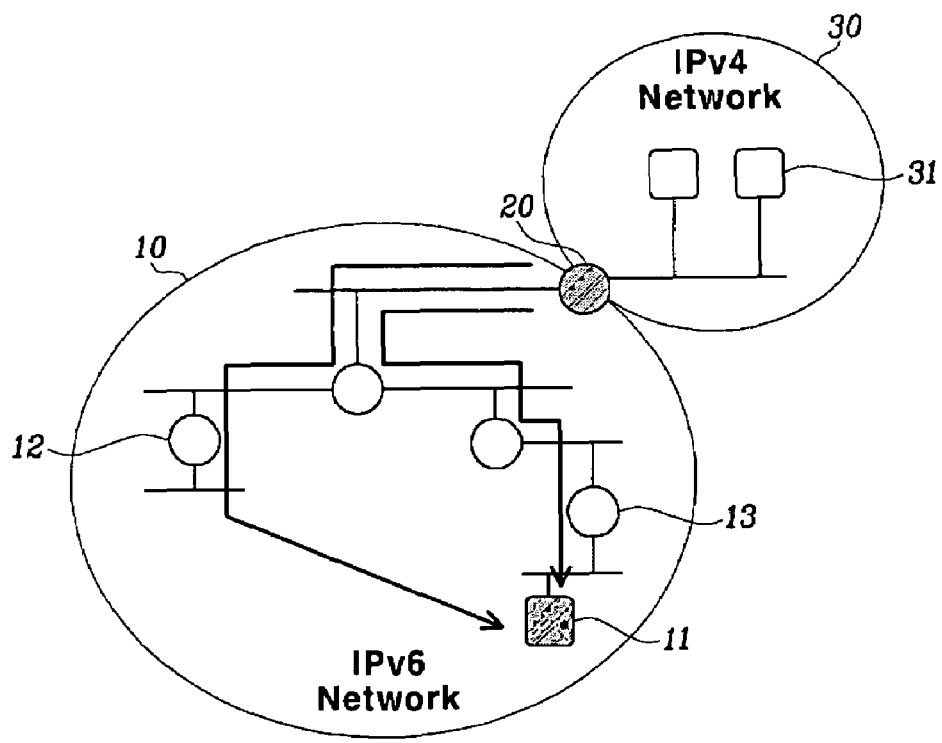
FIG. 4 shows a process for terminating the RR procedure in the communication system according to a preferred embodiment of the present invention.

① IPv6 MN (11)
P1::xxxx/64 (Home Address)
P2::xxxx/64 (Care of Address)
② HN (12)
advertises P1::/64
③ R1 (13)
advertises P2::/64
④ NAT-PT box (20)
advertises PREFIX::/64
Mapping Table: mapping_entry[0]={P1::xxxx/64, w.x.y.z}
Binding Cache Table: binding_cache_entry[0]={ }
Kcn/nonce Table: kcn_entry[0]={HA: P1::xxxx/64, COA: P2::xxxx/64, CN:a.b.c.d, Kcn:nnn, Home Nonce index: nnn, Care-of Nonce Index:nnn}
⑤ IPv4 CN(31)
a.b.c.d As shown in FIG. 4, when the NAT-PT box 20 receives the CoTI and the HoTI from the IPv6 MN 11, the NAT-PT box 20 responds to it as a substitute for the IPv4 CN 31.

Figure 5:
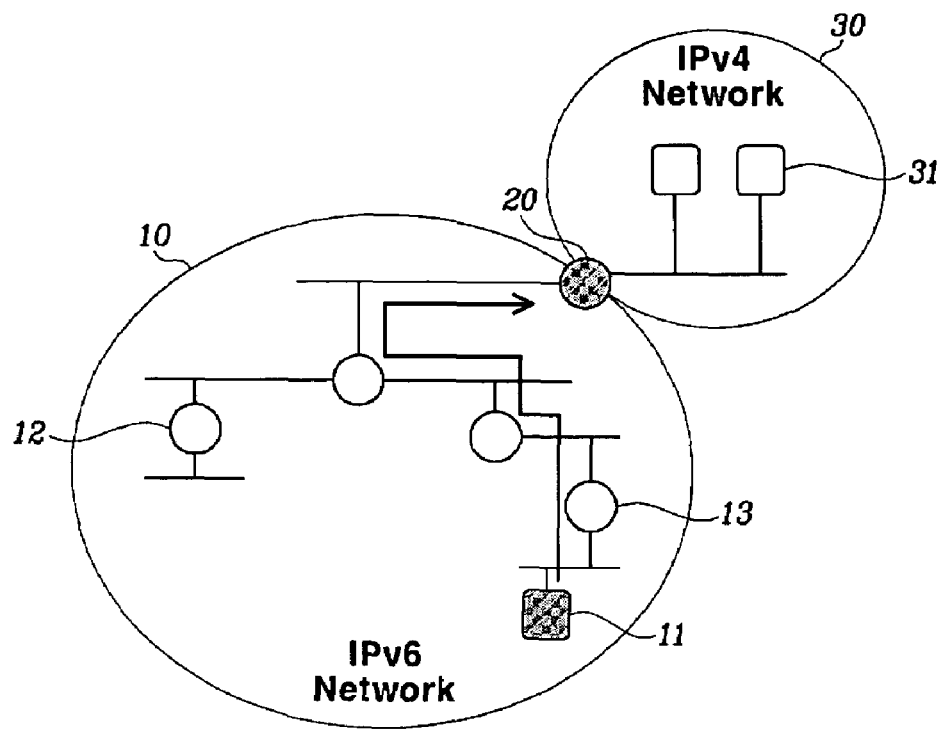
FIG. 5 shows a process for the IPv6 MN to transmit a BU request to the IPv4 CN when the IPv6 MN finishes the RR procedure in the communication system according to a preferred embodiment of the present invention.

As shown in FIG. 5, when the RR procedure is finished and it is determined that the IPv6 MN 11 is ready to transmit the BU message to the IPv4 CN 31, the IPv6 MN 11 transmits the corresponding message. On receiving the BU message, the NAT-PT box 20 updates the binding cache table of the NAT-PT box 20 based on the message. In this instance, the NAT-PT box 20 updates information on the HA and the COA of the IPv6 MN 11 in the binding cache table, and when the packet transmitted to the IPv6 MN 11 from the IPv4 CN 31 is provided, the updated information is used for converting the packet into the IPv6 packet and attaching a routing header thereon.

Figure 6:
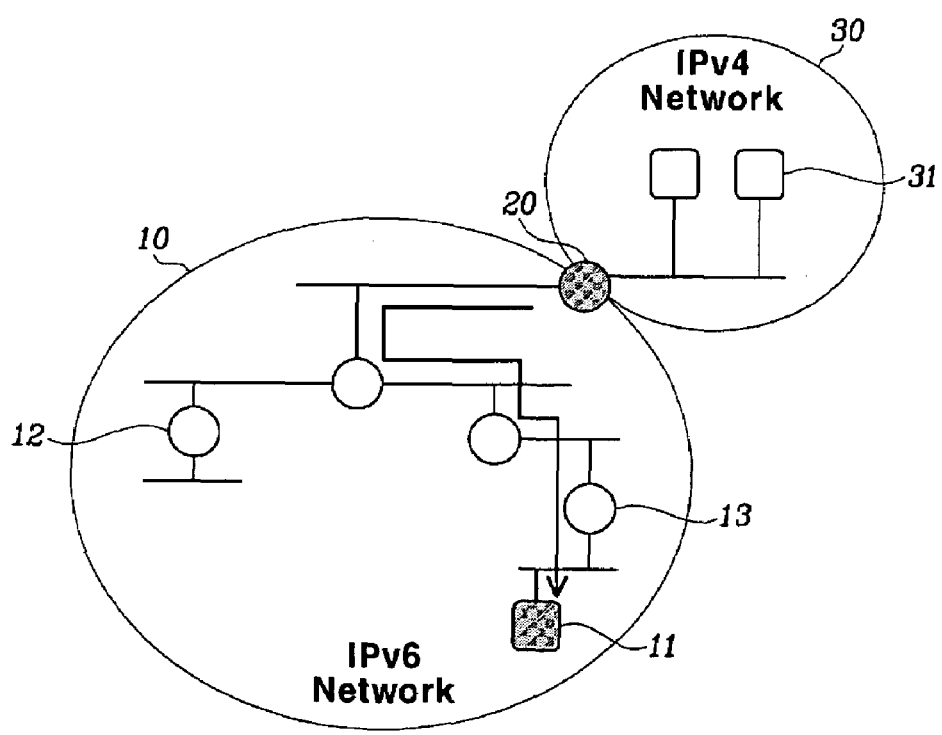
FIG. 6 shows a process for accepting the BU request of FIG. 5.

States of the respective objects in this stage are as follows.
① IPv6 MN(11)
P1::xxxx/64 (Home Address)
P2::xxxx/64 (Care of Address)
② HN (12)
advertises P1::/64
③ R1 (13)
advertises P2::/64
④ NAT-PT (20)
advertises PREFIX::/64
Mapping Table: mapping_entry[0]={P1::xxxx/64, w.x.y.z}
Binding Cache Table: binding_cache_entry[0]={HA: P1:: xxxx/64, COA: P2::xxxx/64, Lifetime: nnn, Flag: 0, Seq. no: nnn, Usage info: nnn}
Kcn/nonce Table: kcn_entry[0]={HA: P1::xxxx/64, COA: P2::xxxx/64, CN:a.b.c.d, Kcn: nnn, Home Nonce index: nnn, Care-of Nonce Index:nnn}
⑤ IPv4 CN(31)
a.b.c.d Next, as shown in FIG. 6, the NAT-PT box 20 transmits a response (a binding acknowledge) message on the BU message to the IPv6 MN 11 as a substitute for the IPv4 CN 31. When this process is finished, the IPv6 MN 11 is ready to communicate with the IPv4 CN 31 in the new network 13.

Figure 7:
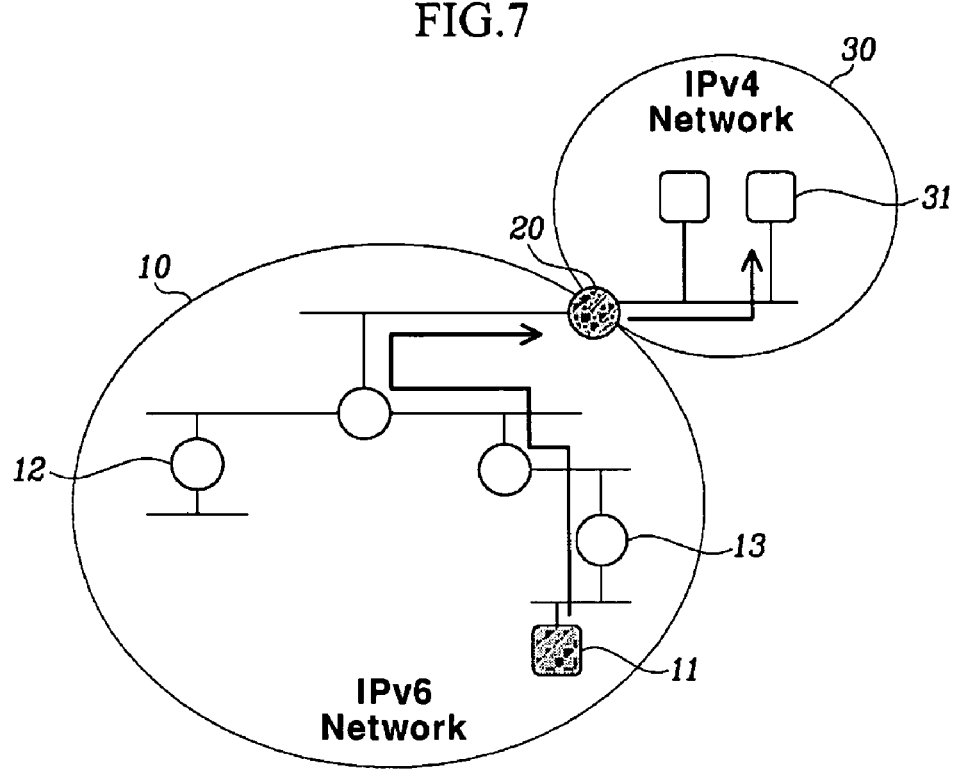
FIGS. 7 and 8 show processes for the IPv6 MN and the IPv4 CN to perform data communication in the communication system according to a preferred embodiment of the present invention.
Figure 8:
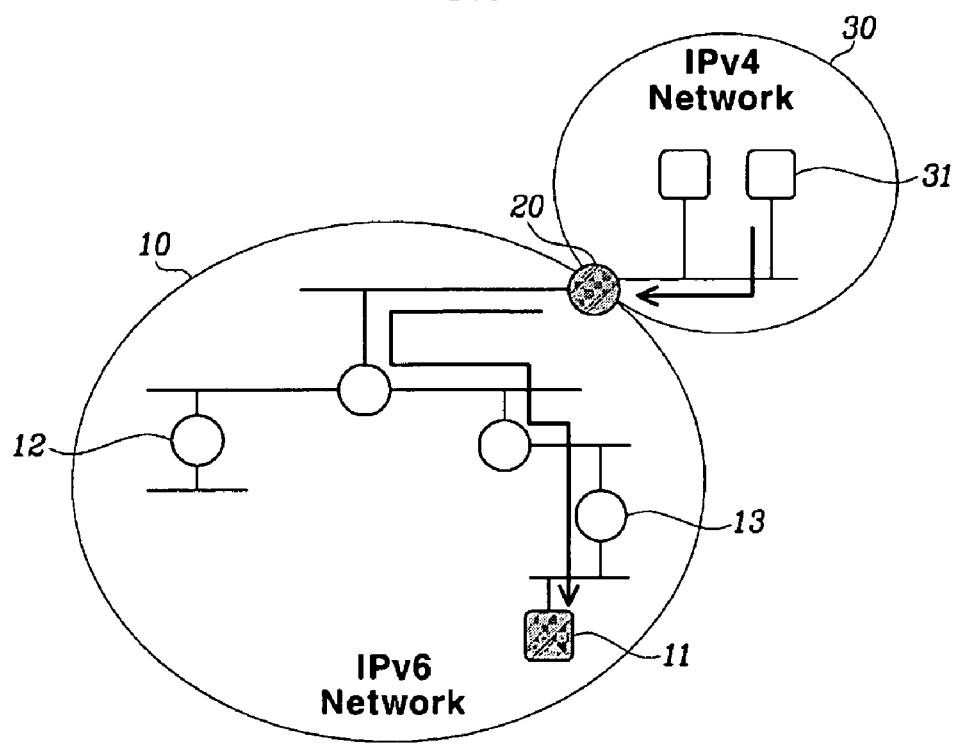

FIGS. 7 and 8 show processes for the IPv6 MN and the IPv4 CN to perform data communication.

The IPv6 MN 11 adds an HA of the IPv6 MN 11 to the destination option header and transmits the same, and the NAT-PT box 20 receives the packet, eliminates the destination option header therefrom, converts it into an IPv4 packet, and transmits it to the IPv4 CN 11.

Also, the NAT-PT box 20 converts the packet provided by the IPv4 CN 31 into an IPv6 packet, and searches the binding cache table to find an entry which has a COA corresponding to the destination address of the IPv6 header. When the corresponding entry is found as a search result, the NAT-PT box 20 adds a routing header including the HA to the header of the IPv6 packet, and transmits the same to the IPv6 MN 11.

The IPv6 MN 11 detects as if the CN 31 communicated by the IPv6 MN 11 is a mobile IPv6 node, and hence, natural communication is performed between the IPv6 MN 11 and the CN 31.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, since the NAT-PT box responds to the message of the IPv6 node instead of the IPv4 node, the mobile IPv6-based mobility support is provided well in the network with the mixed IPv6 and IPv6.

What is claimed is:

1. A method of an NAT-PT (Network Address Translation-Protocol Translation) box for an TPv6 node in an IPv6 network to communicate with a foreign IPv4 node in an IPv4 network, the method comprising:
   (a) allowing the NAT-PT box to receive an RR (Return Routability) request transmitted to the IPv4 node from the IPv6 node when the IPv6 node moves from a home network in the IPv6 network to another network in the IPv6, and perform an RR process which includes responding to the RR request to determine whether a changed address of the IPv6 node is a reachable address while communicating with the IPv4 node, as a substitute for the IPv4 node without allowing the IPv4 node to respond to the RR, wherein the NAT-PT box stores key conversion notice data related to the IPv4 node and generates at least one parameter and a Care-of keygen token for the RR process in response to the RR request and includes the at least one parameter and the Care-of keygen token in an outgoing message to the IPv6 node;
   (b) allowing the NAT-PT box to receive a BU (Binding Update) message transmitted to the IPv4 node from the IPv6 node, and perform a BU process as a substitute for the IPv4 node; and
   (c) allowing the NAT-PT box to use BU information generated when performing the BU process, and perform data communication between the IPv6 node and the IPv4 node.

2. The method of claim 1, wherein (a) comprises:
allowing the NAT-PT box to snatch a CoTI (Care-of Test Init) message and an HoTI (Home Test init) message transmitted to the IPv4 node from the IPv6 node;
allowing the NAT-PT box to store entries generated by mapping parameter information comprising a care-of init cookie included in the CoTI message and the HoTI message, and parameter information generated by the NAT-PT to the address of the IPv4 node in a table, the parameter information comprising a key conversion notice, a home nonce index, and a Care-of nonce index; and
allowing the NAT-PT box to transmit a CoT message and an HoT message to the IPv6 node in response to the CoTI message and the HoTI message, and terminate the RR process.

3. The method of claim 2, wherein the CoT message and the HoT message include parameter information comprising the Care-of keygen and the Care-of nonce index.

4. The method of claim 1, wherein (b) comprises:
allowing the NAT-PT box to snatch the BU message transmitted to the OPv4 node from the IPv6 node;
allowing the NAT-PT box to store information on an HA (Home Address) and a COA (Care of Address) of the IPv6 node in a binding cache table; and
allowing the NAT-PT box as a substitute for the IPv4 node to transmit a BA (Binding Acknowledge) message to the IPv6 node in response to the BU message.

5. The method of claim 4, wherein (c) comprises:
snatching an IPv6 packet transmitted from the IPv6 node, the IPv6 packet having a destination option header including HA information of the IPv6 node;
eliminating the destination option header, converting the IPv6 packet into an IPv4 packet, and transmitting it to the IPv4 node; and
receiving the IPv4 packet from the IPv4 node, referring to contents of the binding cache table, converting the HA of the IPv6 node into the IPv6 packet included in a routing header, and transmitting the same to the IPv6 node.

6. A method of an NAT-PT (Network Address Translation Protocol Translation) box for an IPv6 node in an IPv6 network to communicate with a foreign IPv4 node in an IPv4 network, the method comprising:
   (a) allowing an NAT-PT box to snatch an RR (Return Routability) request transmitted to the IPv4 node from the IPv6 node when the IPv6 node moves from a home network in the IPv6 network to another network in the IPv6, and perform an RR process which includes responding to the RR request to determine whether a changed address of the IPv6 node is a reachable address while communicating with the IPv4 node, as a substitute for the IPv4 node without allowing the IPv4 node to respond to the RR request, wherein the NAT-PT box stores key conversion notice data related to the IPv4 node and generates at least one parameter and a Care-of keygen token for the RR process in response to the RR request and includes the at least one parameter and the Care-of keygen token in an outgoing message to the IPv6 node;
   (b) allowing the NAT-PT box to snatch a BU (Binding Update) message transmitted to the IPv4 node from the IPv6 node, store information on an HA (Home Address) and a COA (Care of Address) of the IPv6 node in a binding cache table, and transmit a BA (Binding Acknowledge) message to the IPv6 node; and
   (c) allowing the NAT-PT box to use the information on the HA and the COA of the IIPv6 node stored in the binding cache table, and perform data communication between the IPv6 node and the IPv4 node.

7. The method of claim 6, wherein (a) comprises:
allowing the NAT-PT box to snatch a CoTI (Care-of Test Init) message and an HoTI (Home Test hit) message transmitted to the IPv4 node from the IPv6 node;
allowing the NAT-PT box to store entries generated by mapping parameter information comprising a care-of init cookie included in the CoTI message and the HoTI message, and parameter information generated by the NAT-PT to the address of the IPv4 node in a table, the parameter information comprising a key conversion notice, a home nonce index, and a Care-of nonce index; and
allowing the NAT-PT box to transmit a CoT message and an HoT message to the IPv6 node in response to the CoTI message and the HoTI message, and terminate the RR process.

8. The method of claim 6, wherein (c) comprises:
snatching an IPv6 packet transmitted from the IPv6 node, the IPv6 packet having a destination option header including HA information of the IPv6 node;

eliminating the destination option header, converting the IPv6 packet into an IPv4 packet, and transmitting it to the IPv4 node; and receiving the IPv4 packet from the IPv4 node, referring to contents of the binding cache table, converting the HA of the IPv6 node into the IPv6 packet included in a routing header, and transmitting the same to the IPv6 node.

* * * * *